US 8,559,071 B2

(12) United States Patent
Kawata

(10) Patent No.: US 8,559,071 B2
(45) Date of Patent: Oct. 15, 2013

(54) PRESSING PLATE

(75) Inventor: Kengo Kawata, Ishikawa (JP)

(73) Assignee: PFU Limited, Ishikawa (JP)

( * ) Notice: Subject to any disclaimer, the term of this patent is extended or adjusted under 35 U.S.C. 154(b) by 129 days.

(21) Appl. No.: 13/344,153

(22) Filed: Jan. 5, 2012

(65) Prior Publication Data

US 2012/0314263 A1 Dec. 13, 2012

(30) Foreign Application Priority Data

Jun. 7, 2011 (JP) ................................ 2011-127494

(51) Int. Cl.
*H04N 1/04* (2006.01)

(52) U.S. Cl.
USPC ............ 358/474; 358/475; 358/501; 358/509

(58) Field of Classification Search
USPC .................. 358/474, 475, 509, 482, 483, 501
See application file for complete search history.

(56) References Cited

U.S. PATENT DOCUMENTS

| | | | | |
|---|---|---|---|---|
| 5,805,272 A | * | 9/1998 | Nozawa et al. ................. | 355/25 |
| 5,886,342 A | * | 3/1999 | Matsui ........................ | 250/208.1 |
| 5,995,245 A | * | 11/1999 | Moro ............................ | 358/474 |
| 6,325,288 B1 | * | 12/2001 | Spitz ......................... | 235/462.12 |
| 6,771,395 B1 | * | 8/2004 | Kito .............................. | 358/474 |
| 7,088,477 B2 | * | 8/2006 | Koshimizu et al. ........... | 358/487 |
| 7,224,487 B2 | * | 5/2007 | Gupta et al. ................. | 358/3.05 |
| 7,428,080 B2 | * | 9/2008 | Koshimizu et al. ........... | 358/474 |
| 7,751,092 B2 | * | 7/2010 | Sambongi et al. ............ | 358/474 |
| 7,808,681 B2 | * | 10/2010 | Hatzav et al. ................. | 358/474 |
| 7,920,300 B2 | * | 4/2011 | Nakaya et al. ................ | 358/474 |
| 2003/0202224 A1 | * | 10/2003 | Moriya ......................... | 358/475 |

FOREIGN PATENT DOCUMENTS

JP 08-181827 7/1996

* cited by examiner

*Primary Examiner* — Negussie Worku
(74) *Attorney, Agent, or Firm* — McDermott Will & Emery LLP

(57) ABSTRACT

A pressing plate is used for an overhead scanner. The overhead scanner includes an imaging unit that images a medium to be read that is placed on a placement surface located under the imaging unit in the vertical direction and a light source that irradiates the medium to be read with light. The pressing plate includes a pressing plate main body for pressing the medium to be read from an upper side in the vertical direction and a plurality of anti-glare units arranged inside the pressing plate main body. The pressing plate main body is light transmissive. The anti-glare units block light reflected toward a side opposite to an incident light side from the light source, with respect to a vertical axis, among light reflected from the medium.

7 Claims, 6 Drawing Sheets

PRESSING PLATE

CROSS-REFERENCE TO RELATED APPLICATIONS

The present application is based upon and claims the benefit of priority from Japanese Patent Application No. 2011-127494 filed in Japan on Jun. 7, 2011. The entire contents of which are incorporated herein by reference.

BACKGROUND OF THE INVENTION

1. Field of the Invention

The present invention relates to a pressing plate.

2. Description of the Related Art

Techniques have been known in which media to be read are placed in a state of being exposed and read from the upper side in the vertical direction. For example, Japanese Patent Application Laid-open No. H8-181827 discloses a reader that includes a reading mechanism for reading light reflected from a document, an arm for holding the reading mechanism above the document with a distance therebetween, and a supporting part for supporting the arm. The reader includes lighting means for lighting the document while images are being read.

When a medium to be read that is placed as being exposed is irradiated with light, a user or a person around the medium may be dazzled due to light reflected from the medium. It is desirable to suppress diffusion of light reflected from the medium. For example, suppressing the diffusion of light reflected in all directions other than a direction toward an imaging unit of an image-reading apparatus can reduce glare from the reflected light that dazzles people near the apparatus.

When the medium to be read that is placed as being exposed is read, the medium having a ruggedness or curl may cause image quality degradation such as a warp of a read image or uneven tone due to light amount unevenness.

SUMMARY OF THE INVENTION

It is an object of the present invention to at least partially solve the problems in the conventional technology.

One aspect of the present invention relates to a pressing plate used for an overhead scanner. The overhead scanner includes an imaging unit for imaging a medium to be read that is placed on a placement surface located under the imaging unit in a vertical direction and a light source for irradiating the medium with light. The pressing plate includes a pressing plate main body for pressing the medium from an upper side in a vertical direction; and a plurality of anti-glare units arranged inside the pressing plate main body. The pressing plate main body is light transmissive. The anti-glare units block light reflected toward a side opposite to a incident light side on which light is incident from the light source, with respect to a vertical axis, among light reflected from the medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A pressing plate according to an embodiment of the invention is explained in detail below with reference to accompanying drawings. The embodiment does not limit the invention. The constituent elements of the following embodiment include elements that those skilled in the art can easily assume or that are substantially the same.

Figure 1:
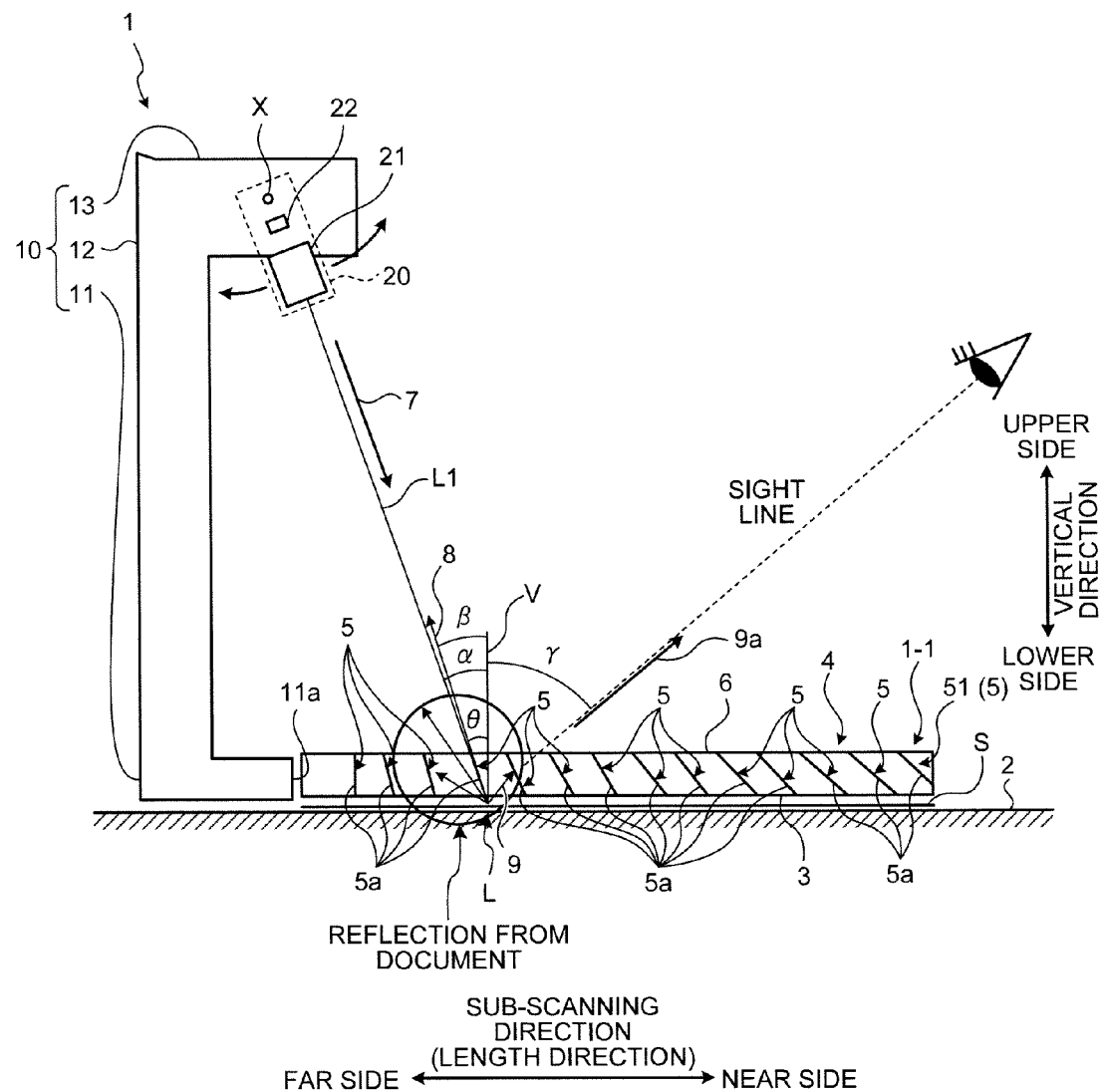
FIG. 1 is a schematic of an image-reading apparatus and a pressing plate according to an embodiment of the invention.
Figure 2:
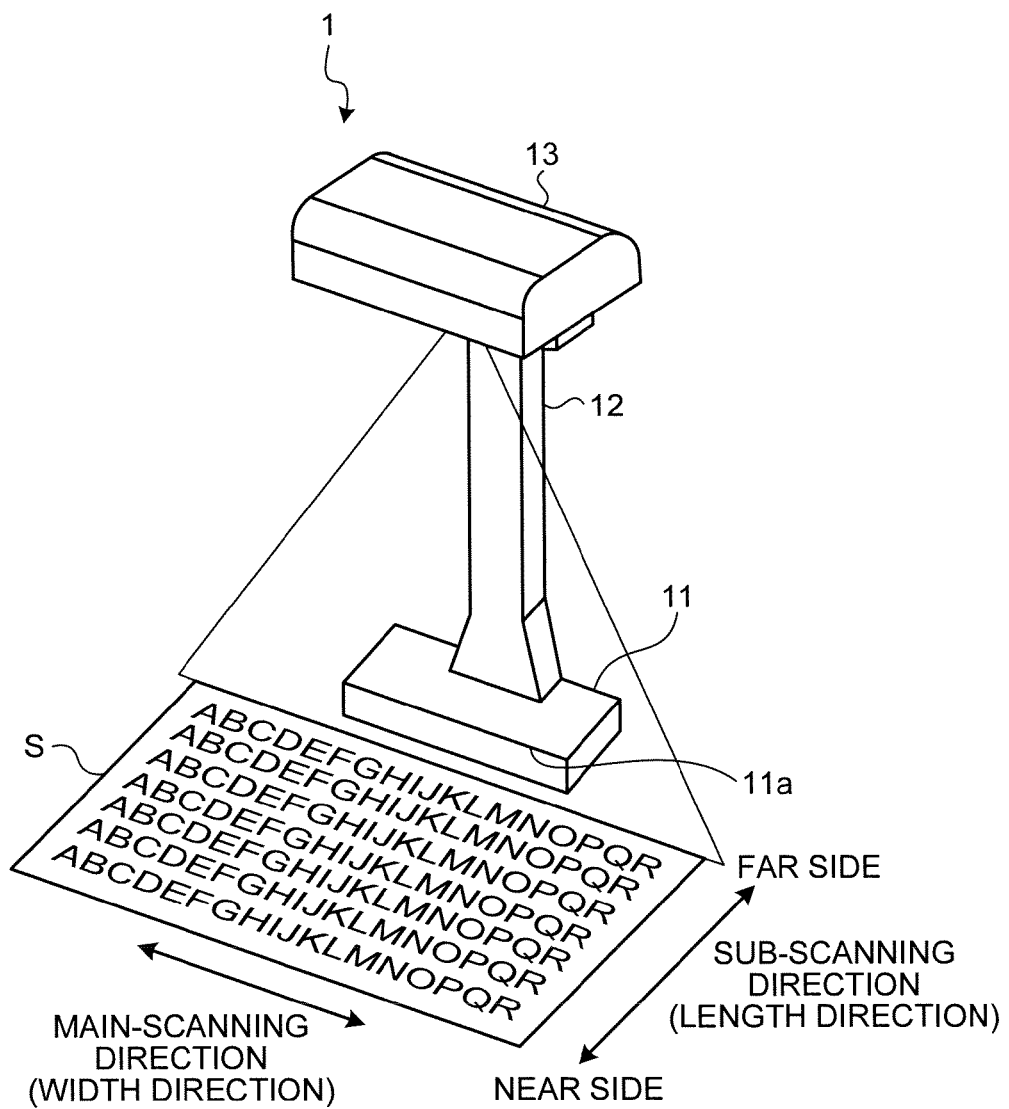
FIG. 2 is a perspective view of the image-reading apparatus according to the embodiment.
Figure 3:
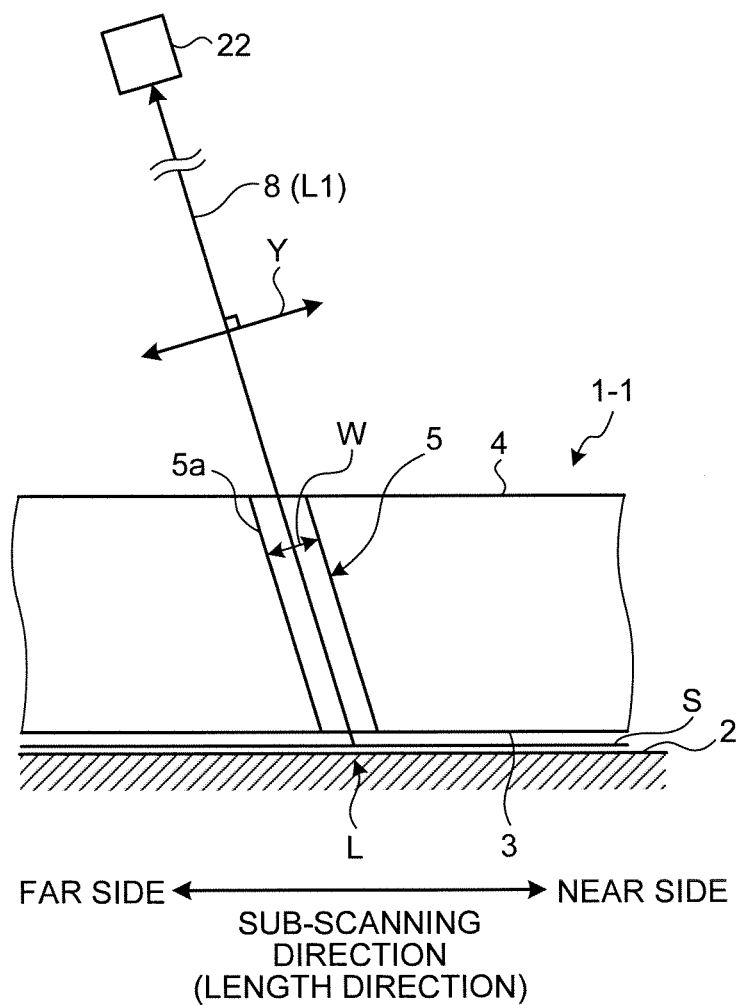
FIG. 3 is an enlarged view of a main portion of the pressing plate according to the embodiment.

An embodiment of the invention is explained with reference to FIGS. 1 to 3. The embodiment relates to a pressing plate for an image-reading apparatus. FIG. 1 is a schematic of an image-reading apparatus and a pressing plate according to the embodiment. FIG. 2 is a perspective view of the image-reading apparatus according to the embodiment. FIG. 3 is an enlarged view of a main portion of the pressing plate according to the embodiment. FIG. 1 depicts a cross-sectional view perpendicular to a rotation axis X.

An image-reading apparatus (refer to reference numeral 1 in FIG. 1) according to the embodiment reads a medium to be read (refer to reference letter S in FIG. 1), which is placed in a room space as being exposed, from the upper side in the vertical direction. In the image-reading apparatus 1, light, which is emitted from a light source (refer to reference numeral 21 in FIG. 1) so as to irradiate the medium S and is reflected from the medium S, diffuses in all directions, by which a user, for example, may be dazzled.

A pressing plate (refer to reference numeral 1-1 in FIG. 1) according to the embodiment includes anti-glare units (refer to reference numeral 5 in FIG. 1) that block diffusing reflected light. The anti-glare unit 5 blocks reflected light (refer to reference numeral 9 in FIG. 1) reflected toward a side opposite to an incident light side on which incident light (refer to reference numeral 7 in FIG. 1) is incident from the light source 21, with respect to a vertical axis V. As a result, the pressing plate 1-1 of the embodiment suppresses the diffusion of light reflected from the medium S and the glare that can dazzle a user.

The image-reading apparatus 1 shown in FIGS. 1 and 2 is an overhead scanner. As shown in FIG. 1, the image-reading apparatus 1 includes a main body 10 and an optical unit 20. The image-reading apparatus 1 can read an image of the medium S to be read placed on a placement surface 2 located under the optical unit 20, i.e., a lower side in the vertical direction. The placement surface 2 is, for example, a flat surface such as a top surface of a desk. In the embodiment, the image-reading apparatus 1 is placed on the same plane as the placement surface 2, as an example, but not limited to this. The place on which the image-reading apparatus 1 is placed may differ from the placement surface 2 on which the medium S is placed. For example, the image-reading apparatus 1 may be provided with a placement table having the placement surface 2.

The main body 10 includes a pedestal 11, a supporter 12, and a cover 13. The pedestal 11 is placed on the placement surface 2, for example, and supports the whole of the main body 10 as a base of the main body 10. Operation members such as a power source switch and an image-reading start switch are arranged on the pedestal 11, for example. The pedestal 11 has a flat shape, for example, and is placed such that a bottom surface thereof and the placement surface 2 are faced to each other. The pedestal 11 of the embodiment has a flat rectangular parallelepiped shape, or a similar or resembling shape thereof. The length in the vertical direction is smaller than both of the length in a width direction (a main-scanning direction, which is described later) and the length in a length direction (a sub-scanning direction, which is described later). The pedestal 11 may be shaped such that the length in the width direction may be larger than the length in the length direction.

The medium S to be read is placed such that a side thereof strikes against a front surface 11a that is one of four side surfaces of the pedestal 11. That is, the medium S to be read is placed on the placement surface 2 such that the side thereof is parallel to the front surface 11a. In the present specification, when the medium S to be read having a rectangular shape is placed such that a side thereof strikes against the front surface 11a, a direction parallel to one side on the front surface 11a of the medium S is described as the "width direction". A direction parallel to a side perpendicular to one side on the front surface 11a of the medium S to be read is described as the "length direction". That is, the length direction is a direction in which a user and the image-reading apparatus 1 are faced to each other when the user faces the image-reading apparatus 1 with the medium S to be read interposed therebetween. When the user faces the image-reading apparatus 1 with the medium S to be read interposed therebetween in the length direction, a side near the user is described as a "near side" while a side remote from the user is described as a "far side".

The supporter 12 is connected to the pedestal 11 and extends upward in the vertical direction from the pedestal 11. The supporter 12 is formed in a columnar shape or a chimney-like shape having a rectangular cross section, for example. The lower portion of the supporter 12 is formed in a tapered shape such that a cross-section thereof increases as it goes downward in the vertical direction. The supporter 12 is connected to one side of an upper surface of the pedestal 11. Specifically, the supporter 12 is connected to one side out of four sides, which form the edge of the upper surface of the pedestal 11, on the side opposite to the side on which the medium S is placed. In other words, the supporter 12 is connected to an end, which is on the far side from the medium S on the pedestal 11. The supporter 12 is connected to a central portion of the pedestal 11 in the width direction.

The cover 13 supports the optical unit 20 rotatably and houses the optical unit 20 therein. The cover 13 covers the optical unit 20 from the upper side in the vertical direction. The cover 13 has a concave portion formed on an under surface thereof, for example, and houses the optical unit 20 inside the concave portion. The cover 13 is connected to an upper end of the supporter 12 in the vertical direction. The cover 13 protrudes from the supporter 12 on the near side in the length direction and on both sides in the width direction. Specifically, the cover 13 protrudes from the supporter 12 to a side on which the medium S to be read (also referred to as a medium S side) is placed and to both sides in the width direction.

In the image-reading apparatus 1, the pedestal 11 and the cover 13 are faced to each other in the vertical direction and are connected by the supporter 12 at both ends located on the medium S side and a side opposite to the medium S side in the length direction. The cover 13 protrudes on the near side in the length direction beyond the pedestal 11. That is, at least a part of the cover 13 and the medium S to be read are faced to each other in the vertical direction when the medium S is placed on the placement surface 2 so as to strike against on the pedestal 11.

The optical unit 20 can rotate about the rotation axis X with respect to the main body 10. The rotation axis X extends in the width direction. That is, the rotation axis X is parallel to the front surface 11a. The optical unit 20 is supported by the cover 13 rotatably about the rotation axis X. A driving unit (not shown) is disposed in an inside of the cover 13. The driving unit rotates the optical unit 20 about the rotation axis X. The driving unit includes an electric motor, and a gear unit that connects a rotation axis of the motor and the optical unit 20, for example. The motor, for example, is a stepping motor and can control a rotational angle of the optical unit 20 with high accuracy. The gear unit, which includes a combination of multiple gears, for example, reduces the rotation of the motor and transmits the reduced rotation to the optical unit 20.

The optical unit 20 includes the light source 21 and an imaging unit 22. The light source 21 includes a light emitting unit such as a light-emitting diode (LED) and irradiates the medium S to be read with light from the upper side in the vertical direction. The light source, for example, 21 may be formed with a plurality of LEDs arranged in a straight line along the main-scanning direction. The light source 21 irradiates an image on a reading target line L of the medium S to be read, i.e., a read image, with light. The imaging unit 22 is, for example, an image sensor including a charge coupled device (CCD) and images the medium S to be read that is placed on the placement surface 2. Specifically, the imaging unit 22 converts the light, which is reflected by a read image on the reading target line L and incident on the imaging unit 22, into electronic data by photoelectric conversion and produces image data of the read image.

The light source 21 is disposed outside the imaging unit 22 in a radial direction perpendicular to the rotation axis X. A direction of an optical axis of the light source 21 is perpendicular to the rotation axis X. The optical axis of the imaging unit 22 coincides with the optical axis of the light source 21 when viewed in an axial direction of the rotation axis X. That is, light in a direction perpendicular to the rotation axis X, when viewed in the axial direction of the rotation axis X, is incident on the imaging unit 22, and the incident light is imaged via a lens on a light receiving surface of the imaging unit 22.

The imaging unit 22 is a line sensor including a plurality of pixels that read an image and are arranged in the main-scanning direction. The imaging unit 22 is disposed in the optical unit 20 such that the main-scanning direction is parallel to the rotation axis X. Each pixel receives light of the read image imaged by the lens on the light receiving surface and outputs an electrical signal corresponding to the received light. The imaging unit 22 reads an image on the reading target line L of the medium S to be read and produces line image data in the main-scanning direction. The number of the line sensor of the imaging unit 22 may be single or multiple.

The image-reading apparatus 1 acquires an image on the reading target line L at any position in the sub-scanning direction on the medium S to be read, by adjusting a rotational position of the optical unit 20 about the rotation axis X. The image-reading apparatus 1 acquires image data of the whole of the medium S to be read, by repeating acquisition of the line image data and positional adjustment of the reading target line L through the rotation of the optical unit 20. That is, in the image-reading apparatus 1, irradiation light from the light source 21 scans the document surface in the sub-scanning direction, and the imaging unit 22 reads an image of the reading target line L irradiated with light, resulting in the image of the medium S to be read being produced. For example, the image-reading apparatus 1 produces two-dimensional image data of the medium S to be read, by reading a line image of each reading target line L while the position of the reading target line L is sequentially shifted from the far side to the near side in the length direction.

The image-reading apparatus 1 is connectable with an external apparatus such as a personal computer (PC). The image-reading apparatus 1 is controllable by the external apparatus and has a function to output produced image data to the external apparatus. The image-reading apparatus 1 can function alone without being connected to the external apparatus. The image-reading apparatus 1 may include a storage device that stores therein produced image data.

When the image-reading apparatus 1 reads the medium S to be read placed as being exposed, if the medium S has a ruggedness or curl, a read document image may be warped or tone unevenness may occur in the document image due to light amount unevenness. The image-reading apparatus 1 according to the embodiment reads the image of the medium S to be read that is placed on the placement surface 2 as being exposed. That is, the image-reading apparatus 1 irradiates the exposed medium S to be read with light emitted from the light source 21, and reads the image of the medium S by light that is reflected from the medium S and incident on the imaging unit 22. Accordingly, when the medium S has a ruggedness or curl, quality may deteriorate during the reading of images.

Reference numeral 1-1 represents a pressing plate used for the image-reading apparatus 1. The pressing plate 1-1 is a pressing member having a plate shape, and presses the medium S to be read from the upper side in the vertical direction. The pressing plate 1-1 presses the medium S from the upper side so as to suppress the ruggedness and the curl of the medium S during the reading of images, thereby enhancing flatness of the medium S. Consequently, the pressing plate 1-1 can suppress a warp, a distortion, and tone unevenness due to light amount unevenness in a read document image, and enhance quality and accuracy of image data produced by the image-reading apparatus 1. The pressing plate 1-1 fixes the medium S to be read on the placement surface 2, by pressing the medium from the upper side. As a result, a user does not need to press the medium S to be read with the hands so that the medium S does not move, thereby enhancing operability of the image-reading apparatus 1.

The pressing plate 1-1 presses the medium S to be read by its own weight, for example. In addition, the pressing plate 1-1 may be depressed downward in the vertical direction by a user. For example, the pressing plate 1-1 may be provided with a grip on both ends thereof in the main-scanning direction. A user holds the grips and depresses the medium S to be read with the pressing plate 1-1 when the medium S has a heavy curl, for example. It is recommended that the grips protrude outward in the main-scanning direction from the pressing plate 1-1. Such arrangement allows the grips to be located outside a reading target area of the image-reading apparatus 1.

The pressing plate 1-1 has a document pressing portion 3 having a plane-like shape. The document pressing portion 3 is, for example, a rectangular surface. The document pressing portion 3 sandwiches the medium S to be read between itself and the placement surface 2, and presses a reading target portion of the medium S from the upper side in the vertical direction. When, for example, the medium S to be read has a sheet shape, the document pressing portion 3 presses a reading target surface of the medium S from the upper side in the vertical direction. When the medium S is a book, magazine, book-bound document or bound document whose double pages are the reading target of the image-reading apparatus 1, the document pressing portion 3 presses the double pages from the upper side in the vertical direction. Consequently, the pressing plate 1-1 suppresses a float or a warp of a page to be read to enhance quality and accuracy of image data produced by the image-reading apparatus 1.

The pressing plate 1-1 can be made of a transparent material through which visible light passes, such as glass and acrylic. The use of a material, which transmits at least visible light of irradiation light from the light source 21 as the material of the pressing plate 1-1, allows the medium S to be pressed and the imaging unit 22 to read the medium S without being hindered. For example, when a user presses the medium S to be read with his hands without using the pressing plate 1-1, the user's hands may enter the reading target area and be read as part of the document. The pressing plate 1-1 of the embodiment enables a user to press the medium S without a substantial influence such as a document image that includes a hand because the pressing plate 1-1 is light transmissive. The pressing plate 1-1 preferably has a size larger than a maximum readable size of the medium S to be read. The pressing plate 1-1 having such a size can press the entire surface of the medium S to be read.

When the image-reading apparatus 1, which is an overhead scanner, reads the medium S to be read that is placed on the placement surface 2, a user may be dazzled due to the light reflected from the medium S. Among light that is emitted by the light source 21 so as to irradiate the medium S and is reflected by the medium S, some light is reflected in the direction of a sight line of a user. When a user sets the medium S on the placement surface 2 and operates the image-reading apparatus 1 to read the medium S while facing the image-reading apparatus 1 with the medium S interposed therebetween, the user continues to be dazzled by the light reflected toward the user while the medium S is being read.

When the exposed medium S is irradiated with light to read the image of the medium S, as described above, irradiation light spreads outside the image-reading apparatus unlike a situation where the medium S is irradiated with light in an internal space of the image-reading apparatus as in a conventional technique. Accordingly, a user may be dazzled due to reflected light and operational comfort may be impaired. In addition, people around the medium S to be read may also be dazzled due to the reflected light. It is desirable that diffusion of irradiation light caused by the medium S and glare that dazzles a user and people near the apparatus are suppressed.

The pressing plate 1-1 of the embodiment includes a plurality of the anti-glare units 5 arranged inside thereof. The anti-glare unit 5 has, for example, a plate shape or a film shape. The anti-glare units 5 are arranged inside the pressing plate 1-1 and extend in a direction parallel to one side surface of the pressing plate 1-1. The anti-glare unit 5 is made of a material through which no visible light passes. The anti-glare unit 5 blocks the reflected light 9 reflected toward a side opposite to an incident light side on which incident light is incident from the light source 21, with respect to the vertical axis V, among light reflected from the medium S. In other words, the anti-glare unit 5 is a light blocking member that blocks the reflected light 9 reflected from the medium S to be read toward the user. The anti-glare unit 5 blocks the reflected light 9 reflected toward the side opposite to the light source 21 side with respect to the vertical axis V, thereby suppressing the glare that dazzles the user.

The anti-glare units 5 are arranged inside a pressing plate main body 4. The pressing plate main body 4 is the main body of the pressing plate 1-1, and is made of a material through which at least visible light passes. The pressing plate 1-1 may be formed by integrating the pressing plate main body 4 and the anti-glare units 5 or by combining a plurality of constituting members. For example, the pressing plate 1-1 may be obtained by integrating the anti-glare units 5 and the pressing plate main body 4 in such a manner that when the pressing plate main body 4 is formed by curing a resin, the anti-glare units 5 are arranged beforehand inside thereof. Alternatively, the pressing plate 1-1 may be formed with an adhesive by constructing the pressing plate main body 4 of a plurality of constituting members and interposing each of the anti-glare units 5 between adjacent constituting members In this case, the anti-glare units 5 may be formed by applying a paint on surfaces to be bonded of the constituting members.

The document pressing portion 3 is formed on the pressing plate main body 4. More specifically, the pressing plate main body 4 of the embodiment is a member having a rectangular plate shape or having a flat rectangular parallelepiped shape, and a surface provided on one side thereof in the thickness direction is the document pressing portion 3. The pressing plate main body 4 presses the medium S to be read with the document pressing portion 3 from the upper side in the vertical direction.

As shown in FIG. 1, the pressing plate 1-1 is placed on the medium S to be read such that an extending direction of the anti-glare units 5 is the main-scanning direction. In the following explanation, the pressing plate 1-1 is explained based on the state in which the pressing plate 1-1 is placed such that the extending direction of the anti-glare units 5 is the main-scanning direction.

The anti-glare units 5 are arranged in the sub-scanning direction so as to be separated from each other with a predetermined distance. That is, a certain anti-glare unit 5 is disposed so as to be separated from its adjacent anti-glare unit 5 with a distance therebetween in the sub-scanning direction. The anti-glare unit 5 is disposed so as to connect an upper surface 6 of the pressing plate main body 4 and the document pressing portion 3 that is a lower surface of the pressing plate main body 4. That is, an upper end of the anti-glare unit 5 is located at an upper portion of the pressing plate main body 4 while an lower end of the anti-glare unit 5 is located at a lower portion of the pressing plate main body 4. The anti-glare unit 5 may have a straight line shape when viewed in the axial direction of the rotation axis X and not be warped with respect to the straight line connecting the upper end and the lower end of the anti-glare unit 5.

Each anti-glare unit 5 extends inside the pressing plate main body 4 from one end side to the other end side of the pressing plate main body 4 in the main-scanning direction in a straight manner. For example, the anti-glare unit 5 is disposed so as to connect one end surface and the other end surface of the pressing plate main body 4 in the main-scanning direction.

The anti-glare unit 5 separates the inside of the pressing plate main body 4 into a far side region and a near side region in the sub-scanning direction. As a result, the reflected light 9 traveling toward the near side in the sub-scanning direction, among light reflected from the medium S to be read, is blocked by the anti-glare unit 5. The anti-glare unit 5 of the embodiment is tilted toward the far side in the sub-scanning direction as moving from a lower side to an upper side in the vertical direction. This tilt allows the anti-glare unit 5 to effectively block the reflected light 9 reflected from the medium S toward the near side in the sub-scanning direction. The anti-glare units 5 tilted in this way may be limited to the anti-glare units 5 that are located on the near side than the rotation axis X in the sub-scanning direction. That is, it may be permitted that the anti-glare units 5 located on the far side in relation to the rotation axis X in the sub-scanning direction are not tilted toward the far side in the sub-scanning direction as moving from a lower side to an upper side in the vertical direction.

The anti-glare unit 5 is disposed at an angle coinciding with an incident angle of light incident on the medium S to be read from the light source 21. When viewed in the axial direction of the rotation axis X, a tilt angle θ of the anti-glare unit 5 with respect to the vertical axis V is equal to an incident angle α of light incident on the medium S to be read from the light source 21. The vertical axis V corresponds to the normal line of the placement surface 2. The incident angle α is the incident angle of light 7 emitted from the light source 21 in an optical axis direction and also represents an angle made between the medium S to be read and the line connecting the light source 21 and the reading target line L. In the embodiment, the light 7 emitted in the optical axis direction travels on a virtual line L1 connecting the rotation center of the rotation axis X and the medium S to be read in a direction perpendicular to the rotation center line of the rotation axis X.

The incident angle α varies with the rotational position of the optical unit 20. Accordingly, the tilt angle θ of the anti-glare unit 5 differs according to the position of the anti-glare unit 5 in the sub-scanning direction. The tilt angle θ of the anti-glare unit 5 located on the near side in the sub-scanning direction is larger than that of the anti-glare unit 5 located on the far side. The anti-glare unit 5 tilted at the tilt angle θ coinciding with the incident angle α suppresses the anti-glare unit 5 from blocking light emitted from the light source 21 to the medium S to be read. That is, projection of a shadow of the anti-glare unit 5 on the reading target line L of the medium S to be read is suppressed. As a result, lowering of reading accuracy due to the anti-glare units 5 arranged inside the pressing plate main body 4 is suppressed.

The anti-glare unit 5 is disposed at an angle coinciding with a reflection angle of light 8 that is reflected from the medium S to be read and incident on the imaging unit 22. When viewed in the axial direction of the rotation axis X, the tilt angle θ of the anti-glare unit 5 is equal to a reflection angle β of the light 8 that is reflected from the medium S to be read and incident on the imaging unit 22. In other words, each anti-glare unit 5 is disposed on the virtual line L1 connecting the imaging unit 22 located at a reading position at which the imaging unit 22 images a read image and the read image. That is, each anti-glare unit 5 is disposed on the virtual line L1 connecting the imaging unit 22 located at the reading position at which the imaging unit 22 images the reading target line L and the reading target line L.

In the embodiment, the light source 21 and the imaging unit 22 are disposed at a same rotational position about the rotation axis X. That is, when viewed in the axial direction of the rotation axis X, the optical axis direction of the light source 21 coincides with the optical axis direction of the imaging unit 22. In other words, the incident angle α of the light 7, which is transmitted from the light source 21 in the optical axis direction and incident on the medium S to be read, is equal to the reflection angle β of the light 8, which is reflected from the medium S and incident on the imaging unit 22. Consequently, the tilt angle θ of the anti-glare unit 5 of the embodiment can suppress the anti-glare unit 5 from blocking both of the light 7 that is transmitted from the light source 21 in the optical axis direction and incident on the medium S and the light 8 that is reflected from the medium S and incident on the imaging unit 22.

As explained with reference to FIG. 3, the thickness of the anti-glare unit 5 is set as a size capable of suppressing the anti-glare unit 5 from being imaged in an image produced by the image-reading apparatus 1. FIG. 3 is an enlarged view of a main portion of FIG. 1. A thickness W of the anti-glare unit 5 represents the width of the anti-glare unit 5 in a direction perpendicular to both of the main-scanning direction and the virtual line L1 (refer to an arrow Y in FIG. 3, and hereinafter, also described as a "predetermined direction"). The thickness W of the anti-glare unit 5, which is defined in a cross section of the anti-glare unit 5 along an optical path of the light 8 incident on the imaging unit 22, is a distance between a position located furthest on one side and a position located furthest on the other side, in the predetermined direction.

The thickness W of the anti-glare unit 5 is equal to or less than the width corresponding to resolution of the imaging unit 22, which is a line sensor. The resolution of the imaging unit 22 is optical resolution, for example. The width corresponding to the resolution may be the following widths: the width corresponding to a minimum pitch that can be resolved by the imaging unit 22, in the predetermined direction; the width of a read image corresponding to the width of a pixel of the imaging unit 22, in the predetermined direction; the width of the light 8 incident on the imaging unit 22, in the predetermined direction; the width of the light 8 that is incident on the imaging unit 22 and imaged on the light receiving surface of the imaging unit 22, in the predetermined direction; the width of a dot on the medium S to be read, in the predetermined direction; and the width of a read image acquired by reading line image data at one time, in the predetermined direction. For example, when the optical resolution of the imaging unit 22 is 300 dpi, the thickness W of the anti-glare unit 5 can be set to be equal to or less than 0.085 mm.

Setting the thickness W of the anti-glare unit 5 to be equal to or less than the width corresponding to the resolution of the imaging unit 22 suppresses the anti-glare unit 5 from being imaged in an image read by the image-reading apparatus 1. From a point of view of suppressing the anti-glare unit 5 from being imaged, it is preferable that the thickness W of the anti-glare unit 5 is smaller. For example, the thickness W of the anti-glare unit 5 may be reduced to equal to or less than half of the width corresponding to the resolution of the imaging unit 22.

The anti-glare unit 5 may be tilted with respect to the light 7 transmitted in the optical axis direction or the light 8 incident on the imaging unit 22 as long as the thickness W is within a permissible value range.

In the anti-glare unit 5, a surface 5a facing the far side in the sub-scanning direction (hereinafter, simply described as a "far side surface") is a reflector that reflects light. The far side surface 5a blocks the reflected light 9 (refer to FIG. 1) reflected toward a side opposite to an incident light side on which the incident light 7 (light irradiated in the optical axis direction) is incident from the light source 21, with respect to the vertical axis V, among light reflected from the medium S to be read. In other words, the far side surface 5a blocks the reflected light 9 reflected toward a direction opposite to the incident light 7 side in the sub-scanning direction with respect to the vertical axis V, and serves as the reflector reflecting the reflected light 9. In the following explanation, the reflected light 9, which is reflected toward the side opposite to the incident light 7 side in the sub-scanning direction with respect to the vertical axis V, is also described as a "predetermined reflected light".

At least part of the predetermined reflected light 9 reflected by the far side surface 5a is incident on the reading target line L. That is, light reflected outward from the medium S to be read returns back to the medium S. This returning light increases a total light amount transmitted to the reading target line L. As a result, a light amount of the light 8 that is reflected by the reading target line L and incident on the imaging unit 22 increases. This increase enables the imaging unit 22 to receive a sufficient light amount compared with a case when no anti-glare units 5 are provided even if a light amount emitted from the light source 21 is reduced. Consequently, an irradiation light amount of the light source 21 can be reduced while maintaining a light amount of light incident on the imaging unit 22. As a result, a light amount of light that is reflected from the medium S to be read and diffuses outward is reduced, and the glare that can dazzle a user can be suppressed.

The far side surface 5a may reflect all of or at least part of visible light. The far side surface 5a reflecting at least part of the predetermined reflected light 9 increases the total light amount irradiated to the reading target line L.

The far side surface 5a preferably has a high effect of reflecting light as a reflector. For example, the far side surface 5a may be made of a paint or material having high reflectance. The far side surface 5a may be formed in a surface shape having high reflectance such as a surface having high smoothness.

The far side surface 5a may have at least one of a concave portion and a convex portion. For example, the far side surface 5a having a concave portion may converge reflected light on the medium S to be read. Alternatively, the far side surface 5a having a convex portion may allow light reflected from the medium S to be read to easily be reflected downward in the vertical direction. The concave or convex portions may be formed by warping only the far side surface 5a or the whole of the anti-glare unit 5.

From a point of view of reducing the glare that can dazzle a user, reflected light traveling toward the user from a surface opposite to the far side surface 5a of the anti-glare unit 5, i.e., the surface on the near side in the sub-scanning direction, is preferably suppressed. The near side surface may be provided as a surface that diffuses light or a deep colored surface so as to hardly reflect light traveling toward the user.

Density of arrangement of the anti-glare units 5 can be determined as required. For example, from a point of view of suppressing light reflected toward a user so as to enhance an anti-glare property, the anti-glare units 5 are preferably arranged at high density. On the other hand, from a point of view of suppressing the anti-glare unit 5 from being imaged in a document image, the anti-glare units 5 are preferably arranged at low density.

For example, the arrangement of the anti-glare units 5 may be determined so as to block at least reflected light traveling toward an assumed user's sight line position, which is assumed in advance. For example, the assumed sight line position can be set as a vertical position of the sight line relative to the placement surface 2 or a sight line position in the length direction. As explained with reference to FIG. 1, a size of a gap between adjacent anti-glare units 5 may be determined so as to be able to block reflected light 9a reflected in the direction of the assumed sight line position, among the predetermined reflected light 9. In this case, each anti-glare unit 5 may be disposed so as to block the predetermined reflected light 9 having a reflection angle that is equal to or larger than a reflection angle γ of the reflected light 9a reflected in the direction of the assumed sight line position, among the predetermined reflected light 9.

The upper surface 6 of the pressing plate 1-1 may be subjected to processing for diffusing light so as to suppress generation of intensive reflected light on the upper surface 6. For example, the surface of the upper surface 6 may be subjected to glare reduction treatment such as forming fine texture or ruggedness, attaching a coating film that diffuses light, and applying a coating material that diffuses light. Performing the process for diffusing light on the upper surface 6 suppresses the generation of intensive light reflected in a fixed direction (e.g., specular reflection direction). For example, the upper surface 6 may be processed such that the upper surface 6 has at least a higher light diffusion level than that of the document pressing portion 3.

The pressing plate 1-1 preferably has a size such that the side thereof on the near side is located beyond the medium S on the near side in the sub-scanning direction when pressing the entire surface of the medium S. This size allows the anti-glare unit 5 capable of blocking the predetermined reflected light to be disposed within the pressing plate 1-1 when the light source 21 irradiates the most near side of the medium S to be read in the sub-scanning direction.

In the embodiment, the imaging unit 22 is disposed on the optical axis of the light source 21 when viewed in the axial direction of the rotation axis X. However, the relative position between the imaging unit 22 and the light source 21 is not limited to this embodiment. For example, the direction of the light 7 emitted from the light source 21 in the optical axis direction may differ from the direction of the light 8 incident on the imaging unit 22. In this case, the tilt angle θ of the anti-glare unit 5 is set to an angle between the incident angle α of the light 7 emitted from the light source 21 in the optical axis direction and the reflection angle β of the light 8, which is the light 7 reflected from the medium S and is incident on the imaging unit 22. For example, the tilt angle θ may be set to the middle angle of the two angles.

First Modification of Embodiment

Figure 4:
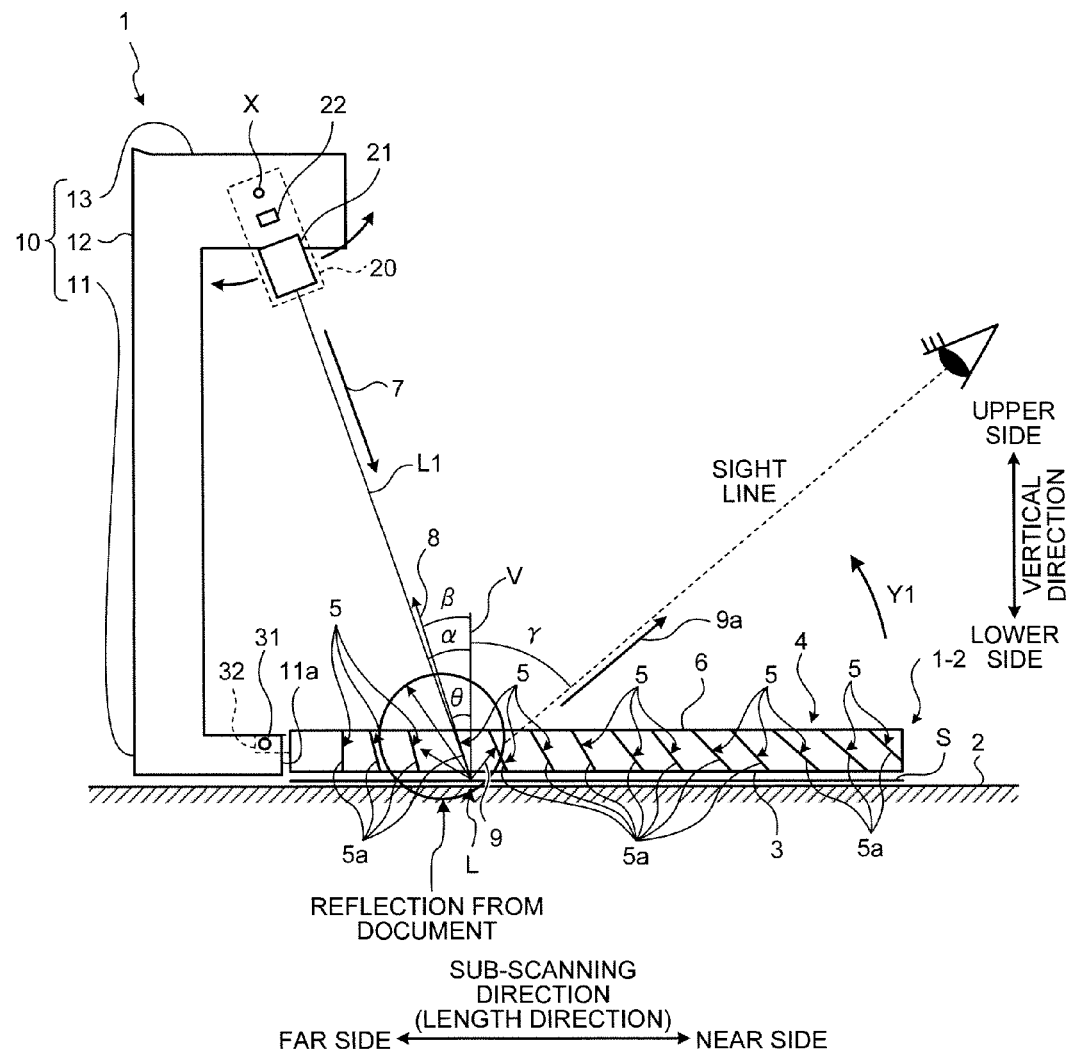
FIG. 4 is a schematic of a pressing plate according to a first modification of the embodiment.

A first modification of the embodiment is explained. A pressing plate may be attachable to the main body 10 or supported by the main body 10. FIG. 4 is a schematic of a pressing plate 1-2 according to the first modification. The pressing plate 1-2 has an axis 31. The axis 31 is a rod-shaped member having a circular cross section and extends in the main-scanning direction. The pressing plate 1-2 has a protrusion 32 protruded from the end on the far side in the sub-scanning direction toward the far side. The axis 31 is connected to the protrusion 32. The axis 31 can function as a supported portion supported by the main body 10.

The pedestal 11 of the main body 10 has a supporter that supports the axis 31. For example, the supporter supports the axis 31 from the lower side in the vertical direction so as to determine a relative position of the axis 31 with respect to the pedestal 11 in the vertical direction. In this case, the supporter may be formed as a receiver having a U-shape when viewed in the axial direction of the rotation axis X. Thus, the supporter can limit a relative movement of the axis 31 with respect to the pedestal 11 in the sub-scanning direction. In addition, the supporter allows the pressing plate 1-2 to be attached to and detached from the main body 10.

The supporter may be a bearing that supports the axis 31 rotatably. For example, the supporter may engage with the axis 31 so as to limit the movement of the axis 31 in a radial direction and support the axis 31 rotatably. A user can rotate the pressing plate 1-2 about the axis 31 as a rotational center in a direction, as indicated by an arrow Y1. The user can, by rotating the pressing plate 1-2, switch between a state in which the pressing plate 1-2 presses the medium S to be read and a state in which the pressing plate 1-2 does not press the medium S.

The pressing plate 1-2 may be used while permanently attached to the main body 10 or may be attachable to and detachable from the main body 10. The pressing plate 1-2 may be foldable. For example, the pressing plate 1-2 can be folded in half at the central portion in the sub-scanning direction. The pressing plate 1-2 that can be folded requires only a small working space when the medium S to be read is placed on or taken from the placement surface 2, and is easily handled. In addition, the image-reading apparatus 1 can be made compact by folding the pressing plate 1-2 when stored.

The pressing plate 1-2 may be fixable to the main body 10, and the main body 10 may support the pressing plate 1-2 with the pressing plate 1-2 floating in the air. For example, when double pages of a book are read, the pressing plate 1-2 placed on the double pages may be tilted. If the pressing plate 1-2 is tilted, a difference may occur between the tilt angle θ of the anti-glare unit 5 and the incident angle α or a difference may occur between the tilt angle θ of the anti-glare unit 5 and the reflection angle β of the light 8 incident on the imaging unit 22. In contrast, when the main body 10 supports the pressing plate 1-2 in parallel with the placement surface 2, with the pressing plate 1-2 floating in the air, the tilt angle θ of the anti-glare unit 5 can be appropriately maintained.

The main body 10 may include a guide that allows the pressing plate 1-2 to move in the vertical direction while the pressing plate 1-2 is held in parallel with the placement surface 2. This guide allows the pressing plate 1-2 to be held in parallel with the placement surface 2 even when the pressing plate 1-2 presses double pages of a book.

Second Modification of Embodiment

Figure 5:
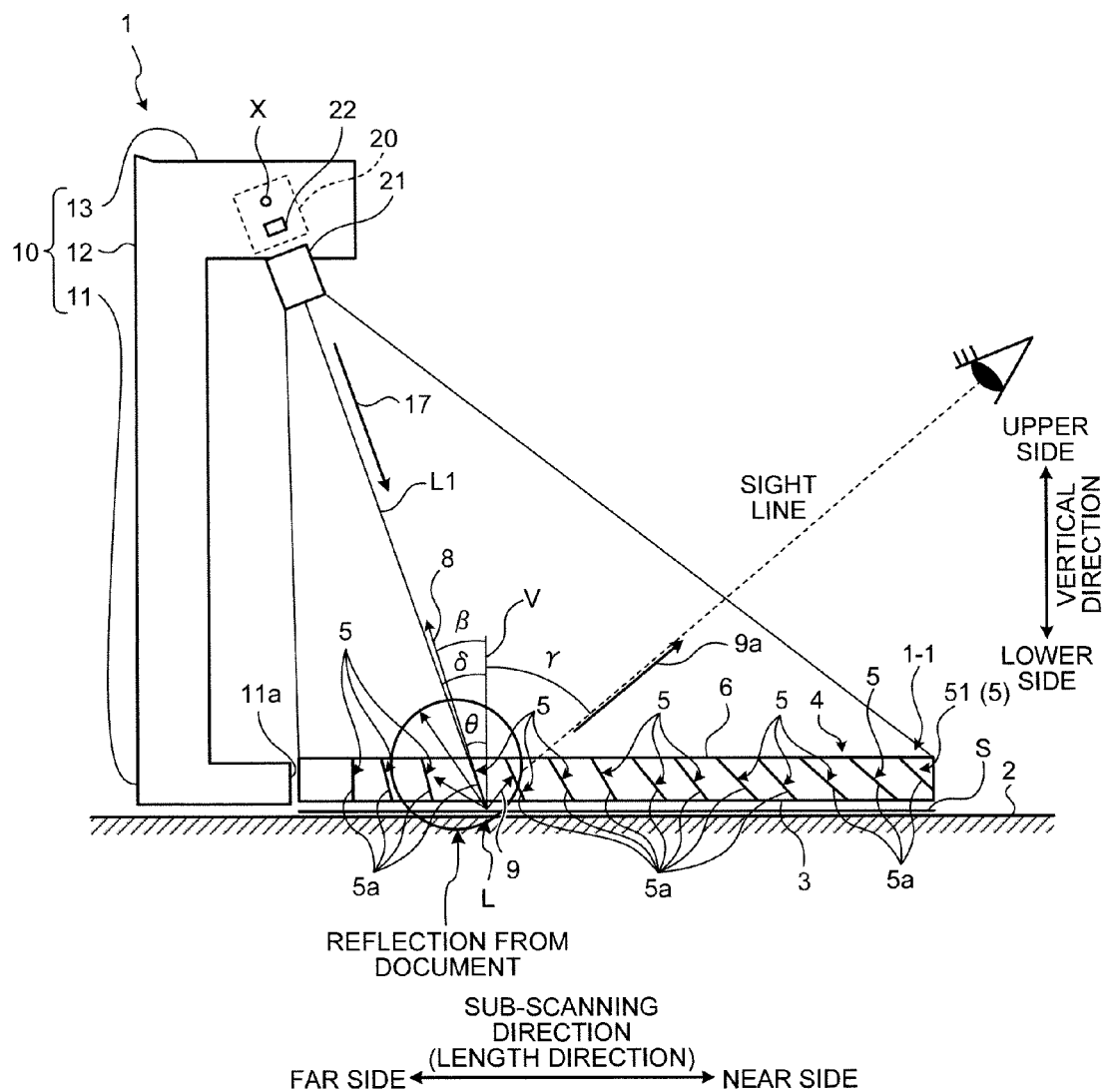
FIG. 5 is a schematic of an image-reading apparatus according to a second modification of the embodiment.

A second modification of the embodiment is explained. The light source 21 and the imaging unit 22 of the above-described embodiment scan the medium S to be read with the rotation of the optical unit 20. However, the invention is not limited to this embodiment. For example, the light source 21 may irradiate the whole of the medium S with light while being fixed. FIG. 5 is a schematic of the image-reading apparatus 1 according to the second modification. In the image-reading apparatus 1, the light source 21 is disposed on the cover 13 to be independent of the optical unit 20 and irradiates the whole of the medium S to be read with light. The light source 21 is fixed on the cover 13 and irradiates the medium S to be read with light from a fixed position. The imaging unit 22 is disposed in the optical unit 20 in the same manner as the above-described embodiment and rotated about the rotation axis X.

In the image-reading apparatus 1 thus structured, the anti-glare unit 5 of the pressing plate 1-1 blocks light reflected toward a side opposite to an incident light side on which incident light 17 is incident from the light source 21, with respect to the vertical axis V, among light reflected from the medium S to be read. The incident light 17 represents light incident on each area on the medium S to be read from the fixed light source 21.

For example, each anti-glare unit 5 is disposed on the virtual line L1 connecting the imaging unit 22, located at a reading position at which the imaging unit 22 images a read image, and the read image. In other words, the tilt angle θ of the anti-glare unit 5 is equal to the reflection angle β of the light 8 that is reflected from the medium S to be read and incident on the imaging unit 22. Each anti-glare unit 5 is disposed so as to be along a traveling direction of the light 17 incident on each area on the medium S from the light source 21. That is, the tilt angle θ of the anti-glare unit 5 corresponds to an incident angle δ of the incident light 17 incident on the medium S from the light source 21. This structure can suppress the light 17 incident on the medium S to be read from the light source 21 from being blocked by the anti-glare unit 5 and the light 8, which is reflected from the medium S and incident on the imaging unit 22, from being blocked by the anti-glare unit 5.

The imaging unit 22 may be an area image sensor that images the whole of the medium S to be read while being fixed. In this case, if the tilt angle θ of the anti-glare unit 5 is equal to the reflection angle β of the light 8 that is reflected from the medium S and incident on the imaging unit 22, the light 8 can be suppressed from being blocked by the anti-glare unit 5.

Third Modification of Embodiment

Figure 6:
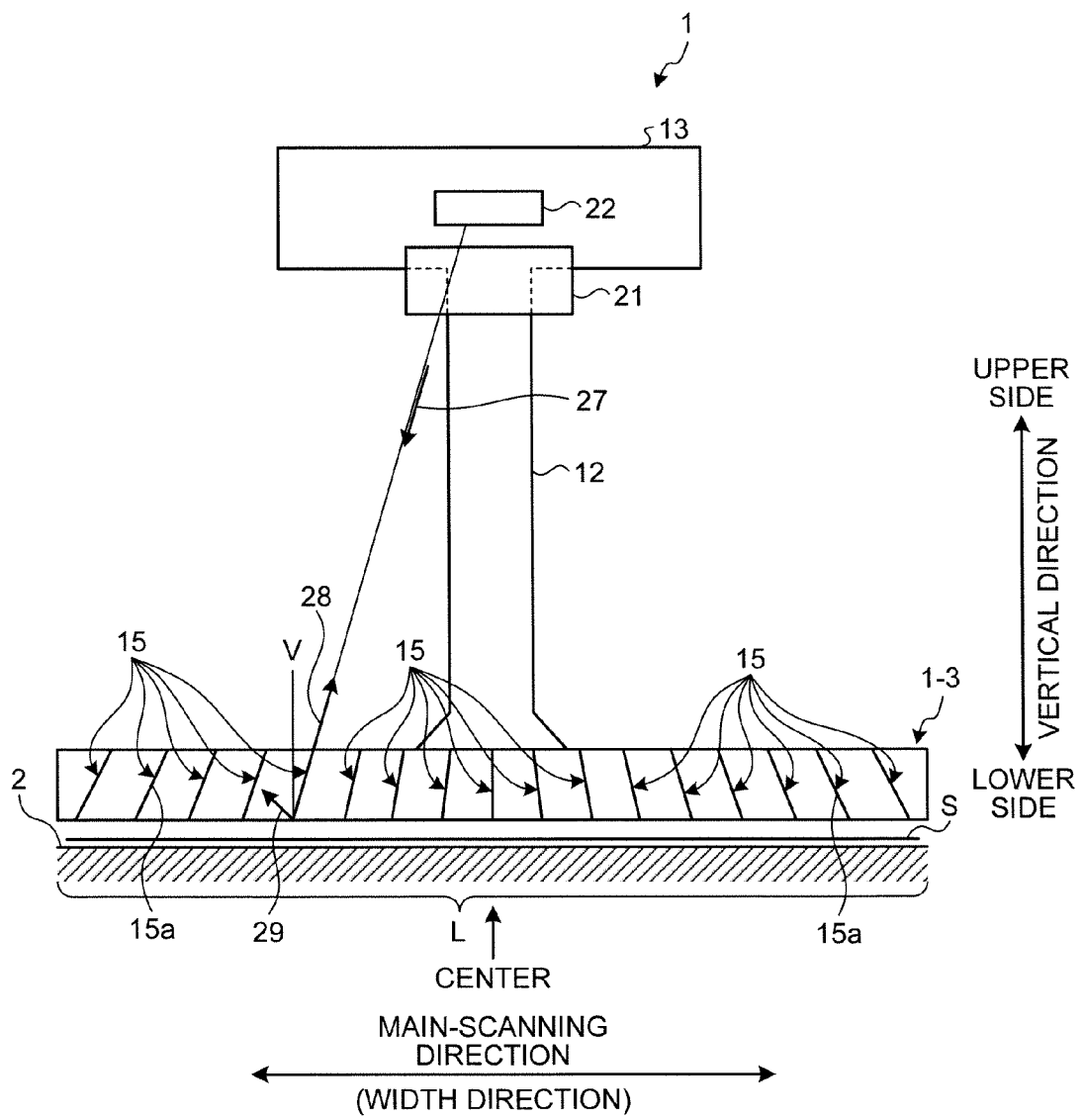
FIG. 6 is a schematic of a pressing plate according to a third modification of the embodiment.

A third modification of the embodiment is explained. Unlike the anti-glare units 5 of the embodiment described above, anti-glare units 15 of the third modification are arranged so as to extend in the sub-scanning direction. In the following explanation, the anti-glare units 5 arranged so as to extend in the main-scanning direction of the embodiment described above are also described as "first anti-glare units 5" while the anti-glare units 15 arranged so as to extend in the sub-scanning direction of the third modification are also described as "second anti-glare units 15". The second anti-glare units 15 suppress light reflected from the medium S to be read from diffusing in the main-scanning direction. FIG. 6 is a schematic of a pressing plate 1-3 according to the third modification. Unlike FIG. 1, FIG. 6 depicts the pressing plate 1-3 when viewed from the near side in the length direction. The light source 21 and the imaging unit 22 are located at the central portion of the image-reading apparatus 1 in the main-scanning direction. The pressing plate 1-3 is disposed such that the center thereof in the main-scanning direction corresponds to each center of the light source 21 and the imaging unit 22. Irradiation light from the light source 21 spreads in the main-scanning direction as the light travels downward in the vertical direction.

The extending direction of the second anti-glare units 15 is a direction perpendicular to the extending direction of the first anti-glare units 5 of the embodiment described above, i.e., the sub-scanning direction. Each second anti-glare unit 15 blocks a reflected light 29 reflected toward a side opposite to an incident light 27 side from the light source 21, with respect to the vertical axis V, among light reflected from the medium S to be read. As a result, light reflected from the medium S to be read is suppressed from diffusing in the main-scanning direction. For example, light from the light source 21 is suppressed from diffusing in the specular reflection direction. Consequently, the glare that can dazzle a person on the side direction of the image-reading apparatus 1 is suppressed.

The second anti-glare unit 15 is tilted toward the center in the width direction of the pressing plate 1-3, as moving from the lower side to the upper side in the vertical direction. The second anti-glare unit 15 is tilted so as to be along light 28 that is reflected from the medium S and incident on the imaging unit 22. For example, the tilt angle of the second anti-glare unit 15 is equal to the reflection angle of the light 28 that is reflected from the medium S to be read and incident on the imaging unit 22. This structure suppresses the second anti-glare unit 15 from being imaged in an image read by the imaging unit 22.

In addition, the second anti-glare unit 15 is tilted so as to be along the light 27 incident on each area of the reading target line L from the light source 21. For example, the tilt angle of the second anti-glare unit 15 is equal to the incident angle of the light 27 incident on each area of the reading target line L. This structure suppresses light incident on the medium S from the light source 21 from being blocked by the second anti-glare unit 15. In the second anti-glare unit 15, a surface 15*a* facing the center of the pressing plate 1-3 in the main-scanning direction (hereinafter, simply described as a "center side surface") may be a reflector that reflects light. The center side surface 15*a* blocks the reflected light (predetermined reflected light) 29 reflected toward a side opposite to an incident light side on which the incident light 27 is incident from the light source 21, with respect to the vertical axis V, among light reflected from the medium S to be read.

Both of the first anti-glare units 5 and the second anti-glare units 15 may be arranged inside the pressing plate 1-3. This structure suppresses light reflected from the medium S from diffusing in the both sub-scanning direction and main-scanning direction.

The contents disclosed in the embodiment and the modification can be implemented by properly combining them.

According to the embodiment of the invention, a pressing plate is used for an overhead scanner. The pressing plate includes a pressing plate main body for pressing a medium to be read from the upper side in the vertical direction and a plurality of anti-glare units arranged inside the pressing plate main body. The pressing plate main body is light transmissive. The anti-glare units block light reflected toward a side opposite to an incident light side from a light source, with respect to a vertical axis, out of light reflected from the medium to be read. The pressing plate according to the embodiment produces an effect of suppressing diffusion of light reflected from the medium to be read.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pressing plate used for an overhead scanner including an imaging unit for imaging a medium to be read that is placed on a placement surface located under the imaging unit in a vertical direction and a light source for irradiating the medium with light, the pressing plate comprising:
   a pressing plate main body for pressing the medium from an upper side in a vertical direction; and
   a plurality of anti-glare units arranged inside the pressing plate main body,
   wherein the pressing plate main body is light transmissive, and
   wherein the anti-glare units block light reflected toward a side opposite to a incident light side on which light is incident from the light source, with respect to a vertical axis, among light reflected from the medium.

2. The pressing plate according to claim 1, wherein each of the anti-glare units is disposed on a virtual line connecting the imaging unit located at a reading position at which the imaging unit images a read image and the read image.

3. The pressing plate according to claim 2, wherein
   the imaging unit is a line sensor including a plurality of pixels that read an image and are arranged in a main-scanning direction, and
   a width of the anti-glare units in a direction perpendicular to both of the main-scanning direction and the virtual line is equal to or less than a width corresponding to resolution of the line sensor.

4. The pressing plate according to claim 1, wherein, a surface in the anti-glare units that blocks light reflected toward the side opposite to the incident light side from the light source, with respect to the vertical axis, among light reflected from the medium, is a reflector that reflects light.

5. The pressing plate according to claim 1, wherein the anti-glare units are at least one of first anti-glare units extending in the main-scanning direction and second anti-glare units extending in a sub-scanning direction.

6. The pressing plate according to claim 1, wherein the pressing plate is attachable to a main body of the overhead scanner.

7. The pressing plate according to claim 1, wherein one surface of the pressing plate opposite to the other surface thereof facing the medium reflects and diffuses light incident thereon.

\* \* \* \* \*